(12) United States Patent
Liu et al.

(10) Patent No.: US 12,235,490 B2
(45) Date of Patent: Feb. 25, 2025

(54) SEMICONDUCTOR STRUCTURE AND METHOD FOR FORMING THE SAME

(71) Applicant: TAIWAN SEMICONDUCTOR MANUFACTURING COMPANY LTD., Hsinchu (TW)

(72) Inventors: Wei-Kang Liu, Taichung (TW); Lee-Shian Jeng, Hsinchu (TW); Chih-Tsung Shih, Hsinchu (TW); Hau-Yan Lu, Hsinchu (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 208 days.

(21) Appl. No.: 17/810,578

(22) Filed: Jul. 1, 2022

(65) Prior Publication Data
US 2024/0004131 A1    Jan. 4, 2024

(51) Int. Cl.
*G02B 6/122* (2006.01)
*G02B 6/13* (2006.01)

(52) U.S. Cl.
CPC ............. *G02B 6/1228* (2013.01); *G02B 6/13* (2013.01)

(58) Field of Classification Search
CPC ........... G02B 2006/12061; G02B 2006/12097; G02B 2006/12126; G02B 6/13; G02B 6/1228; G02B 6/243; G02B 6/266
See application file for complete search history.

(56) References Cited

U.S. PATENT DOCUMENTS

| | | | | |
|---|---|---|---|---|
| 4,372,641 A * | 2/1983 | Johnson | ............... | G02B 6/1228 385/140 |
| 7,919,349 B2 * | 4/2011 | Doerr | .................... | H01L 31/109 438/69 |
| 8,290,325 B2 * | 10/2012 | Reshotko | ............ | H01L 31/1085 385/129 |
| 10,527,793 B1 * | 1/2020 | Liu | .......................... | G02B 5/18 |

OTHER PUBLICATIONS

R Soref, B Bennett. "Silicon optical modulators", Jul. 2010; Nature Photonics 4(8):518-526.

* cited by examiner

*Primary Examiner* — Omar R Rojas
(74) *Attorney, Agent, or Firm* — WPAT LAW; Anthony King

(57) ABSTRACT

A semiconductor structure includes a waveguide and an optical attenuator. The waveguide is disposed over an insulating layer and configured to guide light. The optical attenuator is connected to the waveguide. The optical attenuator has a first surface and a second surface opposite the first surface, and a cross-sectional width of the optical attenuator decreases from the first surface to the second surface.

20 Claims, 19 Drawing Sheets

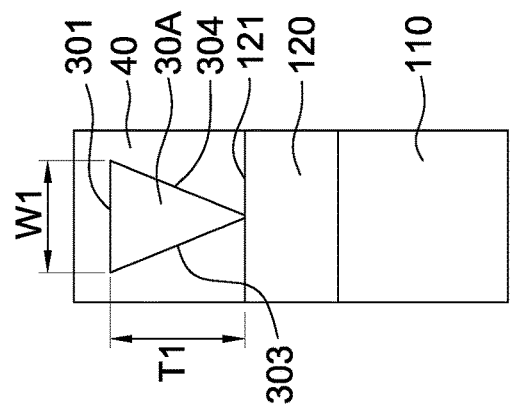
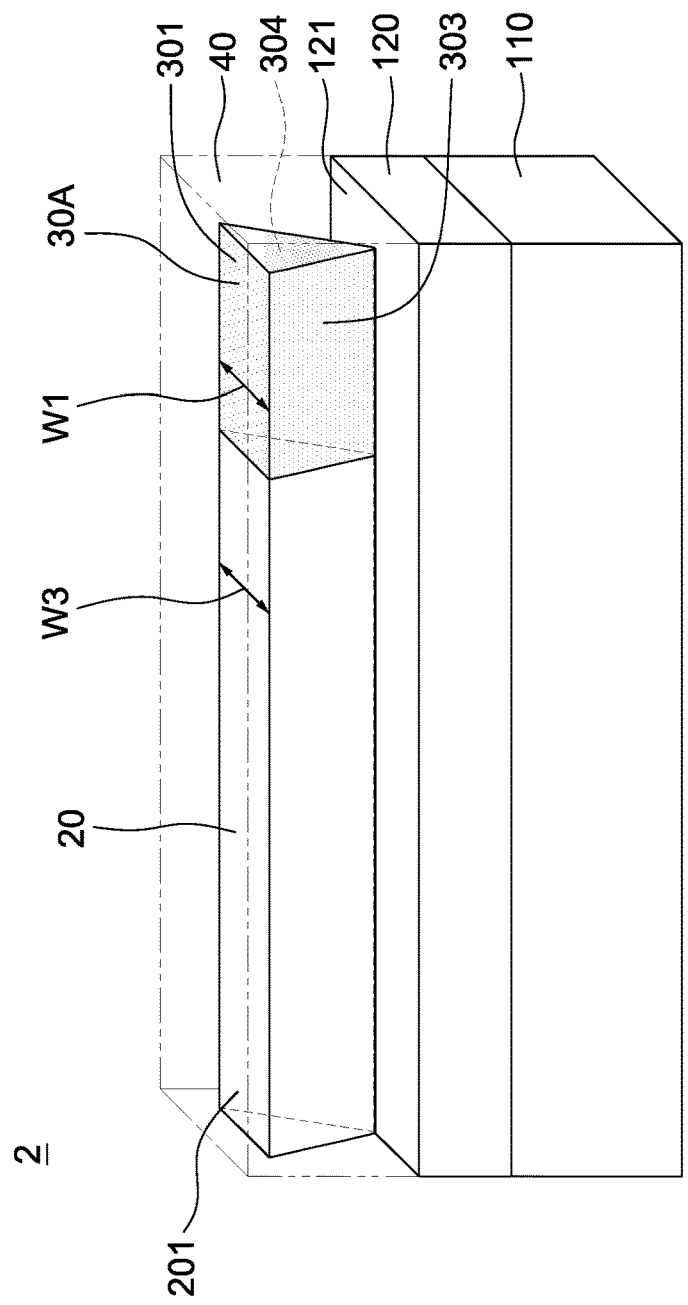
FIG. 2B
FIG. 2A

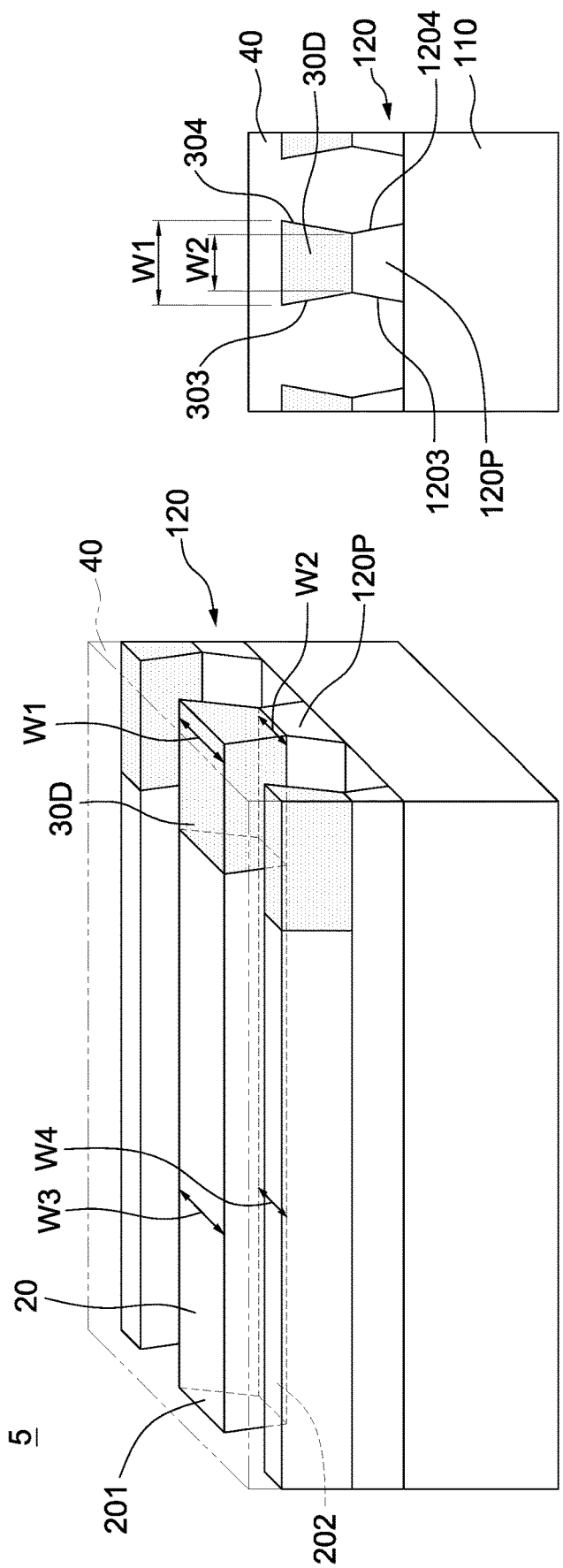

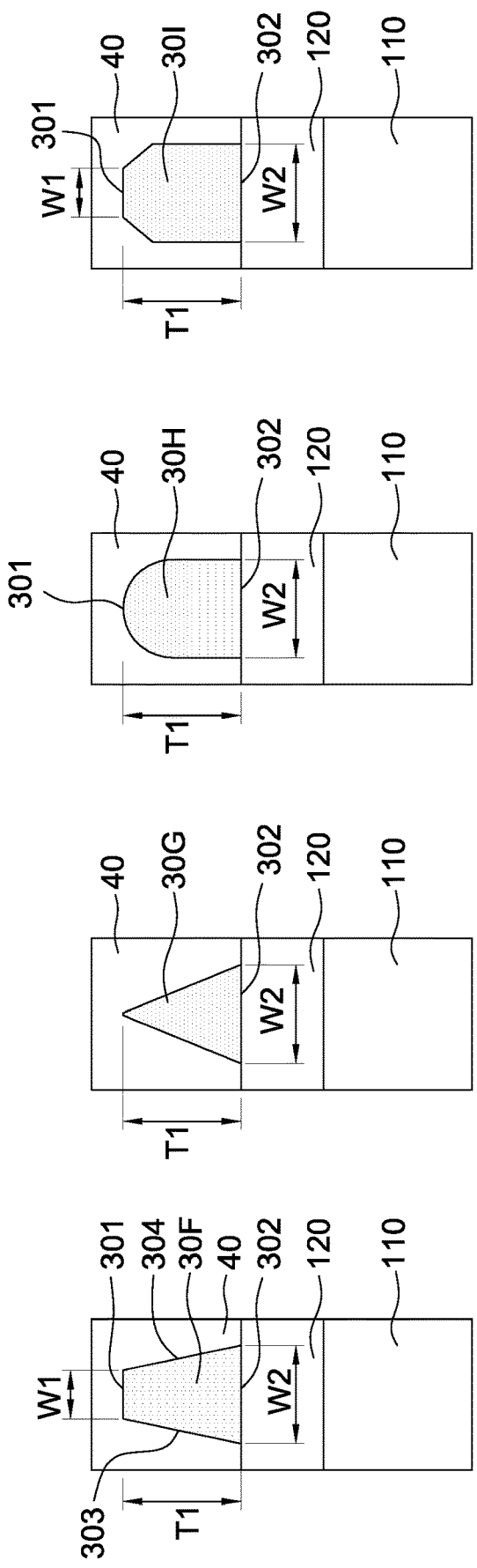

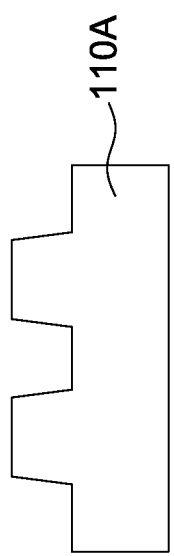
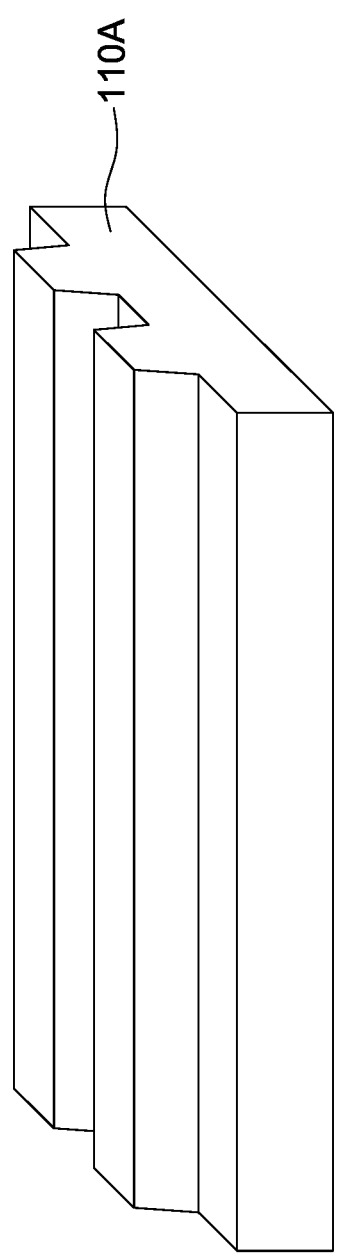
FIG. 9A-2
FIG. 9A-1

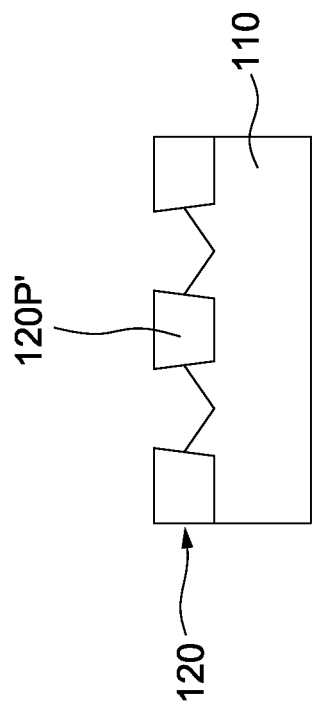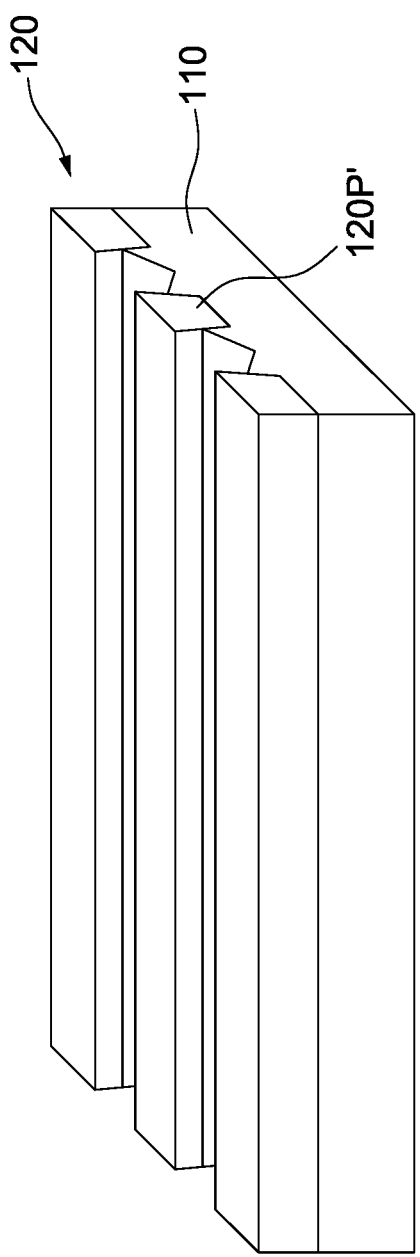
FIG. 9C-1
FIG. 9C-2

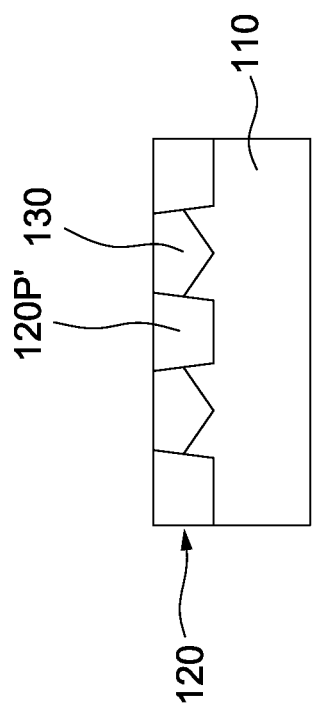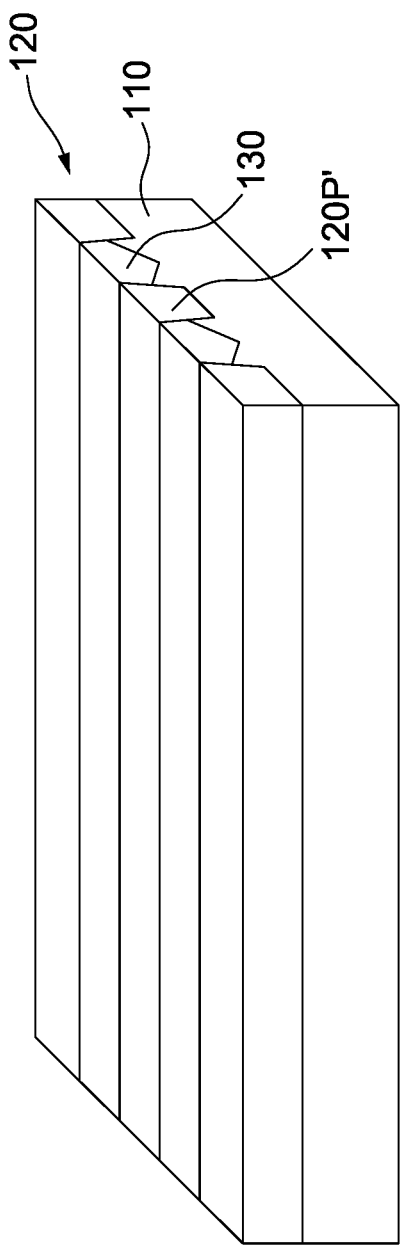

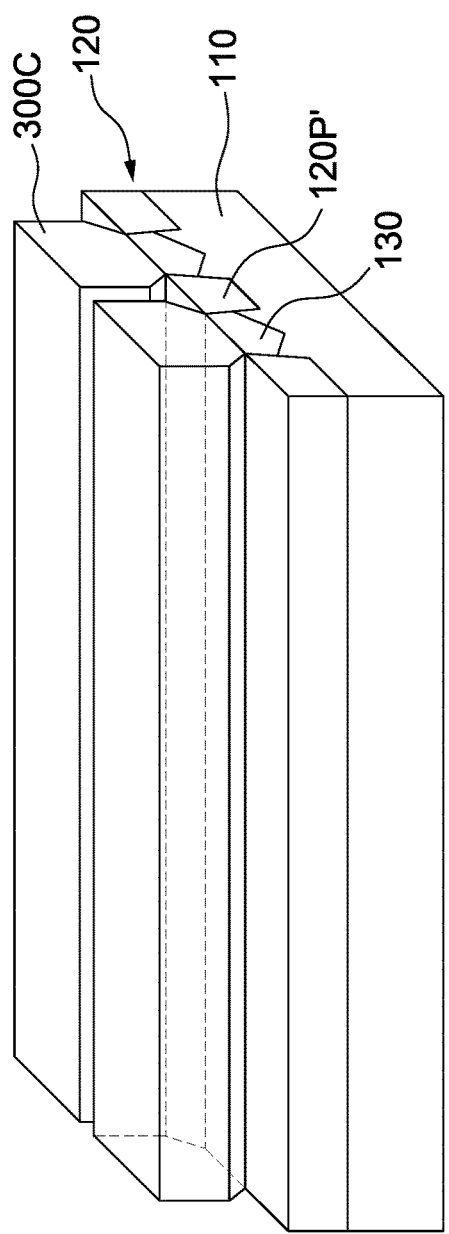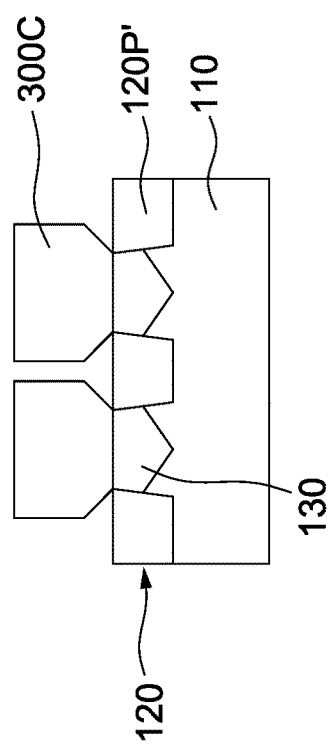
FIG. 9E-1
FIG. 9E-2

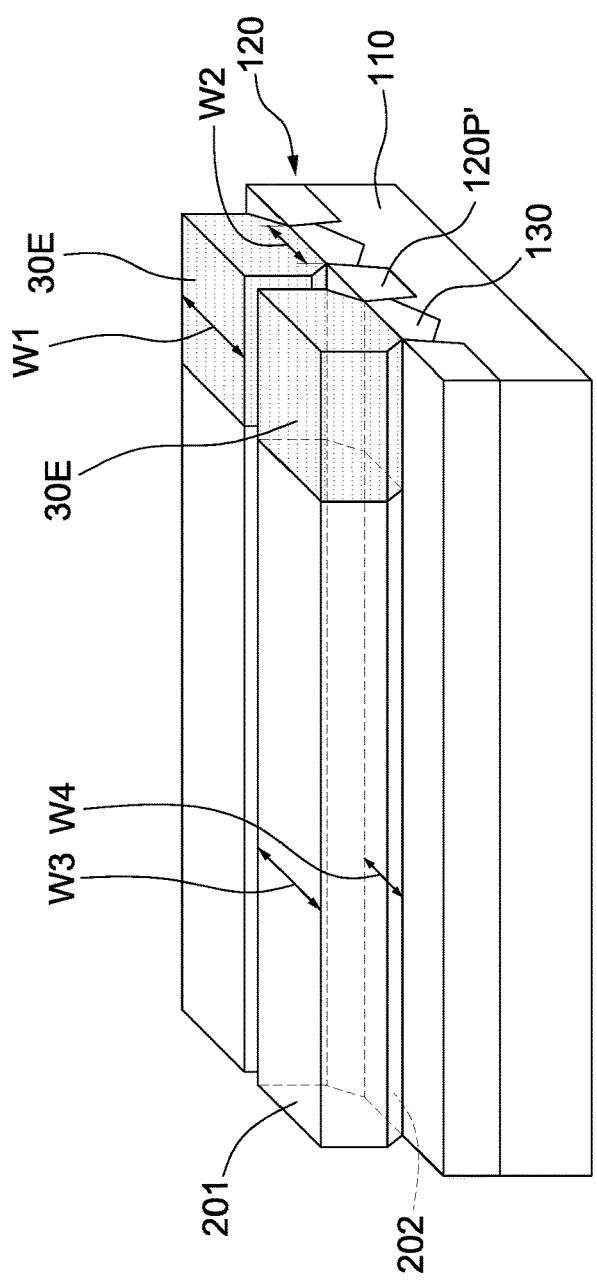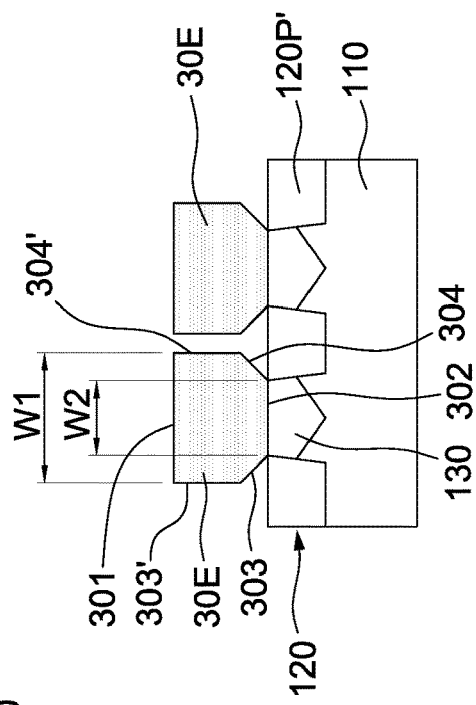
FIG. 9F-1
FIG. 9F-2

SEMICONDUCTOR STRUCTURE AND METHOD FOR FORMING THE SAME

BACKGROUND

Optical signals are usable for high speed and secure data transmission between two devices. In some applications, a device capable of optical data transmission includes at least an integrated circuit (IC or "chip") having a laser die for transmitting and/or receiving optical signals. Also, the device usually has one or more other optical or electrical components and waveguides for the transmission of the optical signals. The performance of photonic or optical components may be affected due to optical transmission performance of waveguides.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2A is a perspective view illustrating a semiconductor structure according to aspects of the present disclosure in one or more embodiments.

FIG. 2B is a cross-sectional view illustrating a semiconductor structure according to aspects of the present disclosure in one or more embodiments.

FIG. 5A is a perspective view illustrating a semiconductor structure according to aspects of the present disclosure in one or more embodiments.

FIG. 5B is a cross-sectional view illustrating a semiconductor structure according to aspects of the present disclosure in one or more embodiments.

FIG. 7A is a cross-sectional view illustrating a semiconductor structure according to aspects of the present disclosure in one or more embodiments.

FIG. 7B is a cross-sectional view illustrating a semiconductor structure according to aspects of the present disclosure in one or more embodiments.

FIG. 7C is a cross-sectional view illustrating a semiconductor structure according to aspects of the present disclosure in one or more embodiments.

FIG. 7D is a cross-sectional view illustrating a semiconductor structure according to aspects of the present disclosure in one or more embodiments.

FIGS. 9A-1 to 9G-2 are cross-sectional views illustrating a semiconductor structure at various fabrication stages according to aspects of the present disclosure in one or more embodiments.

DETAILED DESCRIPTION

Figure 1A:
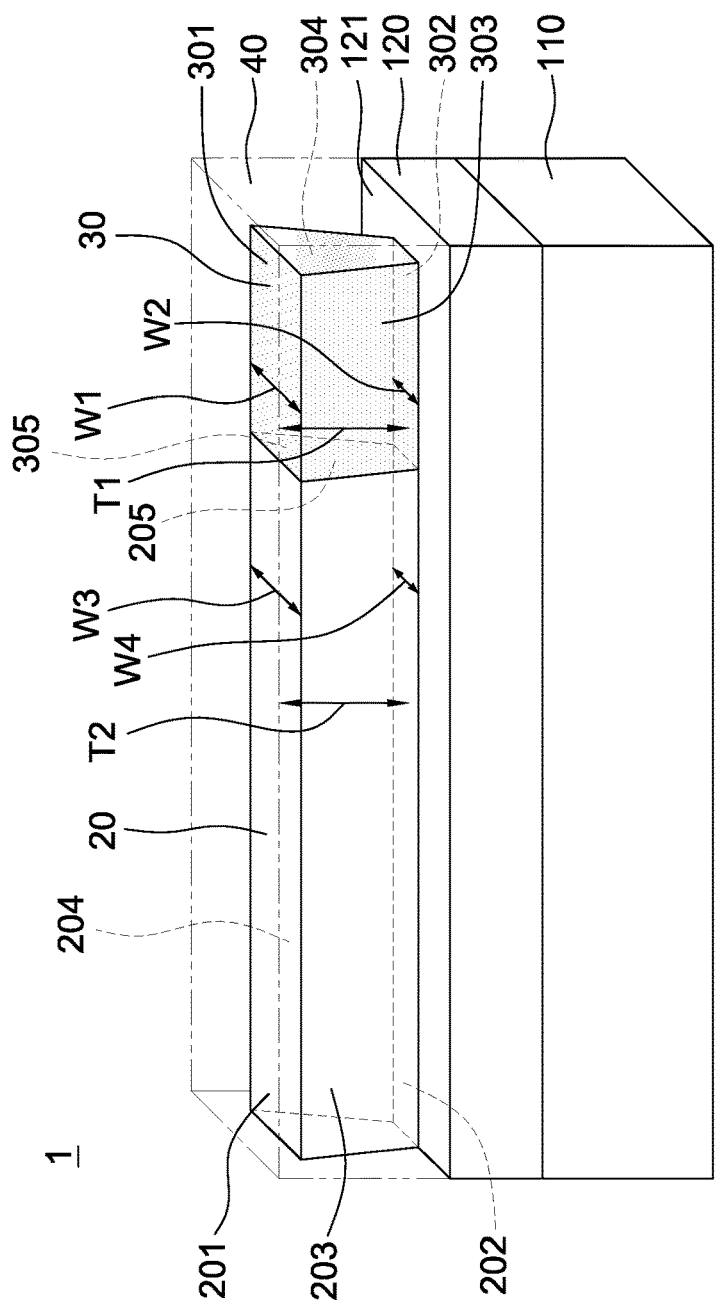
FIG. 1A is a perspective view illustrating a semiconductor structure according to aspects of the present disclosure in one or more embodiments.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, but these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating; working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Embodiments of the present disclosure discuss semiconductor structures including a waveguide and an optical attenuator connected to the waveguide, and the optical attenuator has a tapered shape. With the design of the optical attenuator including a doped structure and having a tapered shape tapering towards a region with a relatively low dopant concentration, light can converge to a region with a relatively high dopant concentration and relatively high light absorption. Accordingly, the attenuation loss of the optical attenuator can be improved.

Figure 1B:
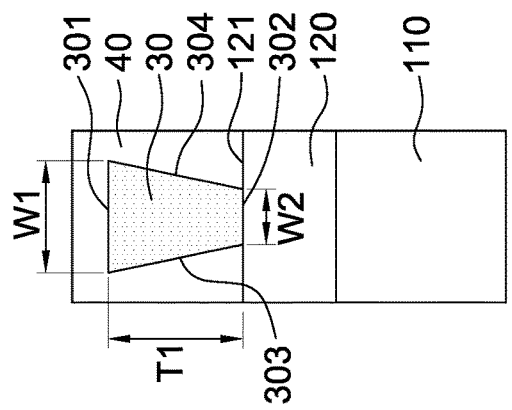
FIG. 1B is a cross-sectional view illustrating a semiconductor structure according to aspects of the present disclosure in one or more embodiments.

FIG. 1A is a perspective view illustrating a semiconductor structure 1 according to aspects of the present disclosure in one or more embodiments, and FIG. 1B is a cross-sectional view illustrating a semiconductor structure 1 according to aspects of the present disclosure in one or more embodiments. In some embodiments, FIG. 1B is a cross-sectional view illustrating a portion of the semiconductor structure 1 in FIG. 1A.

Referring to FIGS. 1A and 1B, the semiconductor structure 1 includes a semiconductor substrate 110, an insulating layer 120, a waveguide 20, an optical attenuator 30, and a dielectric structure 40.

The semiconductor substrate 110 may be or include a semiconductor layer or a printed circuit hoard (PCB) substrate. In some embodiments, the semiconductor substrate 110 includes silicon. The insulating layer 120 may include oxide, such as silicon oxide ($SiO_x$, where x>0). The insulating layer 120 may be or include an oxide layer. The insulating layer 120 may be referred to as a buried oxide layer or a buried insulator. In some embodiments, the insulating layer 120 includes a dielectric material having a refractive index lower than that of the waveguide 20.

The waveguide 20 may be configured to guide light (or optical signal). In some embodiments, the waveguide 20 is disposed over the insulating layer 120. In some embodiments, the waveguide 20 is disposed over a top surface 121 of the insulating layer 120. In some embodiments, the waveguide 20 includes a semiconductor material. In some embodiments, the waveguide 20 may be or include silicon, silicon nitride ($SiN_x$, where x>0), silicon oxynitirde ($SiO_xN_y$, where x>0 and y>0), silicon carbide ($Si_xC_y$, where x>0 and y>0), or other suitable material.

In some embodiments, the waveguide 20 has a tapered shape. In some embodiments, the waveguide 20 includes a tapered structure. In some embodiments, the waveguide 20 has a tapered shape from a cross-sectional view. The waveguide 20 has a top surface 201, a bottom surface 202 opposite the top surface 201, and side surfaces 203 and 204 extending between the top surface 201 and the bottom surface 202. In some embodiments, the waveguide 20 has a tapered shape that tapers in a direction from the top surface 201 to the bottom surface 202. In some embodiments, the waveguide 20 has a tapered shape that tapers in a direction normal to the top surface 121 of the insulating layer 120. In some embodiments, a cross-sectional width of the waveguide 20 decreases from the top surface 201 to the bottom surface 202. In some embodiments, a width W3 of the top surface 201 is greater than a width W4 of the bottom surface 202. The waveguide 20 has a thickness T2 which may vary according to actual applications. In some embodiments, a thickness T2 of the waveguide 20 is from about 0.2 μm to about 4 μm.

The optical attenuator 30 may be configured to degrade unwanted optical signal transmitted from the waveguide 20. For example, the optical attenuator 30 may be configured to absorb or extinct unwanted light from the waveguide 20 to prevent it from reflecting back into the waveguide 20. In some embodiments, the optical attenuator 30 is connected to the waveguide 20.

In some embodiments, the optical attenuator 30 has a tapered shape. In some embodiments, the optical attenuator 30 includes a tapered structure. In some embodiments, the optical attenuator 30 has a tapered shape from a cross-sectional view. The optical attenuator 30 has a top surface 301, a bottom surface 302 opposite the top surface 301, and side surfaces 303 and 304 extending between the top surface 301 and the bottom surface 302. In some embodiments, the optical attenuator 30 has a tapered shape that tapers in a direction from the top surface 301 to the bottom surface 302. In some embodiments, the optical attenuator 30 has a tapered shape that tapers in a direction normal to the top surface 121 of the insulating layer 120. In some embodiments, a cross-sectional width of the optical attenuator 30 decreases from the top surface 301 to the bottom surface 302. In some embodiments, a width W1 of the top surface 301 is greater than a width W2 of the bottom surface 302. The optical attenuator 30 has a thickness T1 which may vary according to actual applications. In some embodiments, a thickness T1 of the optical attenuator 30 is from about 0.2 μm to about 4 μm, from about 0.22 μm to about 3.8 μm, from about 0.27 μm to about 3 μm, or, from about 0.5 μm to about 2.5 μm.

In some embodiments, the optical attenuator 30 further has a surface 305 (also referred to as "a side surface" or "a lateral surface") extending between the top surface 301 and the bottom surface 302. The surface 305 may be substantially perpendicular to the top surface 121 of the insulating layer 120. In some embodiments, the optical attenuator 30 contacts the insulating layer 120 by the bottom surface 302, and the optical attenuator 30 contacts the waveguide 20 by the surface 305. In some embodiments, the waveguide 20 has a surface 205 (also referred to as "a side surface" or "a lateral surface") extending between the top surface 201 and the bottom surface 202, and the surface 205 of the waveguide 20 contacts the surface 305 of the optical attenuator 30.

In some embodiments, the optical attenuator 30 may be or include a doped structure. In some embodiments, the doped structure has a gradient dopant concentration decreasing in a direction from the top surface 301 to the bottom surface 302 of the optical attenuator 30. In some embodiments, a dopant concentration of the doped structure proximal to the top surface 301 may be about 100 times a dopant concentration of the doped structure proximal to the bottom surface 302. In some embodiments, the dopants may be n-type dopants or p-type dopants. The dopants may include phosphorus, arsenic, boron, or any suitable dopants. In some embodiments, the doped structure is connected to the waveguide 20. In some embodiments, the doped structure has a tapered structure that tapers in a direction normal to the top surface of the insulating layer 120. In some embodiments, the doped structure has a tapered shape (e.g., from a cross-sectional view) that tapers in a direction normal to the top surface of the insulating layer 120.

In some embodiments, the waveguide 20 and the optical attenuator 30 (or the doped structure) include a same semiconductor material. In some embodiments, the waveguide 20 is formed integrally with the optical attenuator 30 (or the doped structure). In some embodiments, the surface 205 of the waveguide 20 contacts and entirely overlaps the surface 305 of the optical attenuator 30. In some embodiments, the bottom surface 202 of the waveguide 20 and the bottom surface 302 of the optical attenuator 30 form an integral and continuous surface. In some embodiments, the top surface 201 of the waveguide 20 and the top surface 301 of the optical attenuator 30 form an integral and continuous surface. In some embodiments, the side surface 203 of the waveguide 20 and the side surface 303 of the optical attenuator 30 form an integral and continuous surface. In some embodiments, the side surface 204 of the waveguide 20 and the side surface 304 of the optical attenuator 30 form an integral and continuous surface. In some embodiments, the width W1 of the top surface 301 of the optical attenuator 30 is substantially the same as the width W2 of the top surface 201 of the waveguide 20. In some embodiments, the width W3 of the bottom surface 302 of the optical attenuator 30 is substantially the same as the width W4 of the bottom surface 202 of the waveguide 20.

The dielectric structure 40 may cover the waveguide 20 and the optical attenuator 30. In some embodiments, the waveguide 20 and the optical attenuator 30 are embedded in the dielectric structure 40. In some embodiments, the dielectric structure 40 includes a dielectric material having a refractive index lower than that of the waveguide 20. The dielectric structure 40 may include oxide, such as silicon oxide ($SiO_x$, where x>0).

In some cases where a waveguide spiral or a cap metal layer may be used to attenuate unwanted light or optical signal, the waveguide spiral or the cap metal may take a relatively large device area, which is disadvantageous to miniature of device size as well as the design flexibility. In contrast, according to some embodiments of the present disclosure, the optical attenuator 30 includes a doped structure that is connected to the waveguide 20, and thus the free carriers from the doped structure can induce optical absorption to attenuate unwanted light or optical signal. Therefore, the device area occupied by the doped structure is relatively small, and a satisfactory attenuation loss can be provided by the optical attenuator 30.

In addition, a higher dopant concentration is provided with a better light absorption; however, a higher dopant concentration creates a higher refractive index, and light tends to converge at regions with lower refractive index. According to some embodiments of the present disclosure, the doped structure of the optical attenuator 30 has a tapered shape with a portion having a relatively small width (e.g., a portion adjacent to the bottom surface 302 having a width W2 less than the width W1 of the top surface 301), and the tapered portion can generate a relatively high equivalent refractive index at the region with a relatively low dopant concentration. Therefore, with the design of the doped structure of the optical attenuator 30 having a tapered shape tapering towards a region with a relatively low dopant concentration, the light can converge to the region with relatively high dopant concentration having relatively high light absorption. Accordingly, the attenuation loss of the optical attenuator 30 can be improved.

Presented below are simulation results of optical mode field adjustments by various optical attenuators according to embodiments of the present disclosure. Table 1 shows attenuation loss, refractive index, and the structural details of the optical attenuators.

TABLE 1

| Embodiments | E1 | E2 |
| --- | --- | --- |
| Dopant concentration adjacent to top surface | 5.47E+19 | 5.47E+19 |
| Width of top surface (μm) | 2.6 | 2.6 |
| Refractive index adjacent to top surface | 3.46 | 3.46 |
| Dopant concentration adjacent to bottom surface | 3.36E+17 | 3.36E+17 |
| Width of bottom surface (μm) | 2.6 | 0.6 |
| Thickness (μm) | 3 | 3 |
| Refractive index adjacent to bottom surface | N/A | 3.27 [1] |
| Attenuation loss (dB/mm) | 34.3 | 80.5 |

[1] equivalent refractive index

From the results in table 1, due to the design of the tapered shape of the optical attenuator 30 in embodiment E2, the optical mode field may be adjusted to converge at the region proximal to where the dopant concentration is relatively high (e.g., the region adjacent to the top surface of the optical attenuator 30), and thus the light absorption of the optical attenuator 30 is improved. Therefore, the attenuation loss of the optical attenuator 30 can be improved.

FIG. 2A is a perspective view illustrating a semiconductor structure 2 according to aspects of the present disclosure in one or more embodiments, and FIG. 2B is a cross-sectional view illustrating a semiconductor structure 2 according to aspects of the present disclosure in one or more embodiments. In some embodiments, FIG. 2B is a cross-sectional view illustrating a portion of the semiconductor structure 2 in FIG. 2A. In some embodiments, the semiconductor structure 2 is similar to the semiconductor structure 1 in FIGS. 1A-1B, with differences therebetween as follows. Descriptions of similar components are omitted.

In some embodiments, the waveguide 20 has a triangle shape from a cross-sectional view. In some embodiments, the optical attenuator 30A has a triangle shape from a cross-sectional view. In some embodiments, the optical attenuator 30A may be or include a doped structure. In some embodiments, the optical attenuator 30A has a gradient dopant concentration decreasing in a direction from the top surface 301 to a bottom tip of the optical attenuator 30A. In some embodiments, the width W1 of the top surface 301 of the optical attenuator 30A is substantially the same as the width W3 of the top surface 201 of the waveguide 20.

Figure 3A:
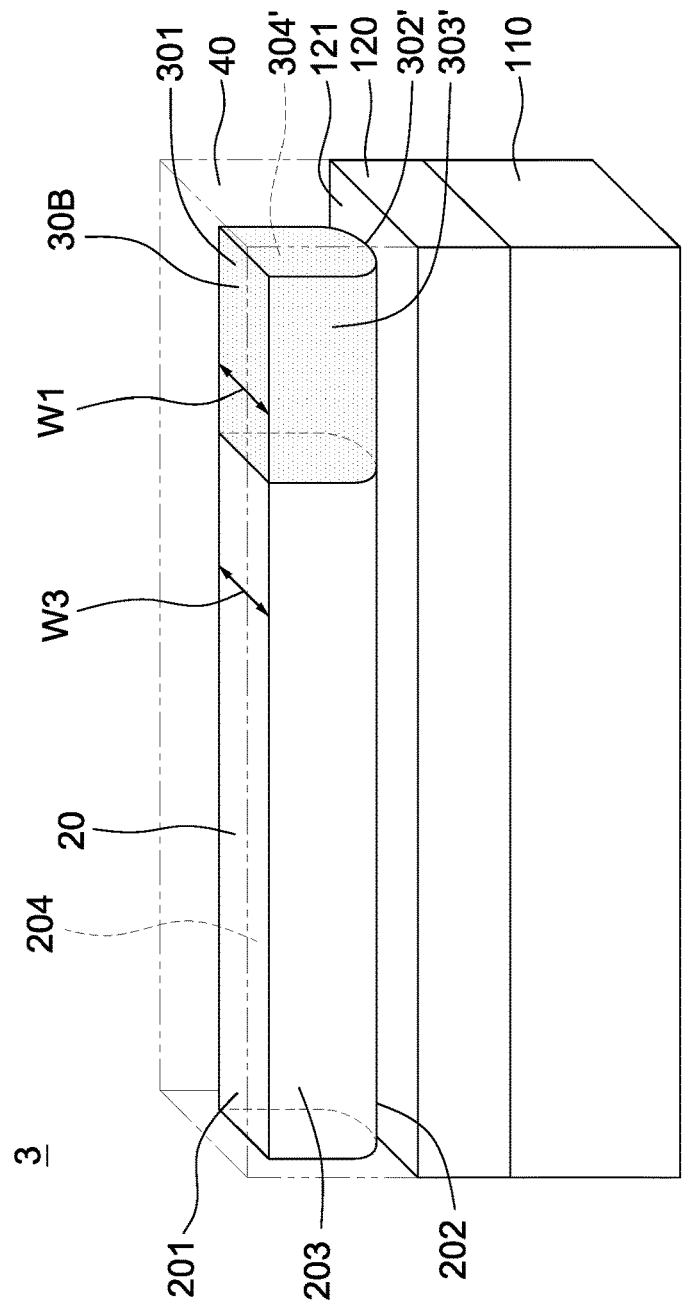
FIG. 3A is a perspective view illustrating a semiconductor structure according to aspects of the present disclosure in one or more embodiments.
Figure 3B:
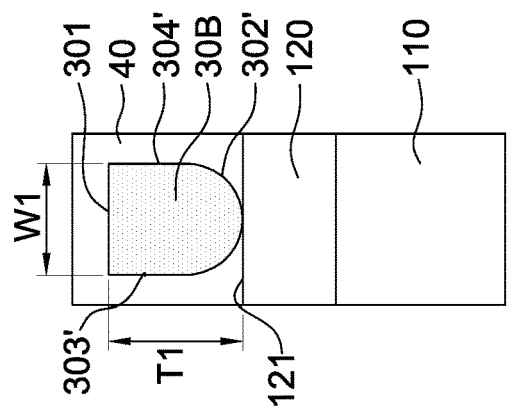
FIG. 3B is a cross-sectional view illustrating a semiconductor structure according to aspects of the present disclosure in one or more embodiments.

FIG. 3A is a perspective view illustrating a semiconductor structure 3 according to aspects of the present disclosure in one or more embodiments, and FIG. 3B is a cross-sectional view illustrating a semiconductor structure 3 according to aspects of the present disclosure in one or more embodiments. In some embodiments, FIG. 3B is a cross-sectional view illustrating a portion of the semiconductor structure 3 in FIG. 3A. In some embodiments, the semiconductor structure 3 is similar to the semiconductor structure 1 in FIGS. 1A-1B, with differences therebetween as follows. Descriptions of similar components are omitted.

In some embodiments, the waveguide 20 has a curved bottom surface 202. In some embodiments, the side surfaces 203 and 204 are substantially perpendicular to the top surface 121 of the insulating layer 120. In some embodiments, the optical attenuator 30B has a curved bottom surface 302'. In some embodiments, the side surfaces 303' and 304' are substantially perpendicular to the top surface 121 of the insulating layer 120. In some embodiments, the optical attenuator 30B may be or include a doped structure. In some embodiments, the optical attenuator 30B has a gradient dopant concentration decreasing in a direction from the top surface 301 to the bottom surface 302' of the optical attenuator 30B. In some embodiments, the width W1 of the top surface 301 of the optical attenuator 30B is substantially the same as the width W3 of the top surface 201 of the waveguide 20. According to some embodiments of the present disclosure, the curved bottom surface 202 with a relatively small curvature radius can provide an improved attenuation loss.

Figures 4A, 4B:
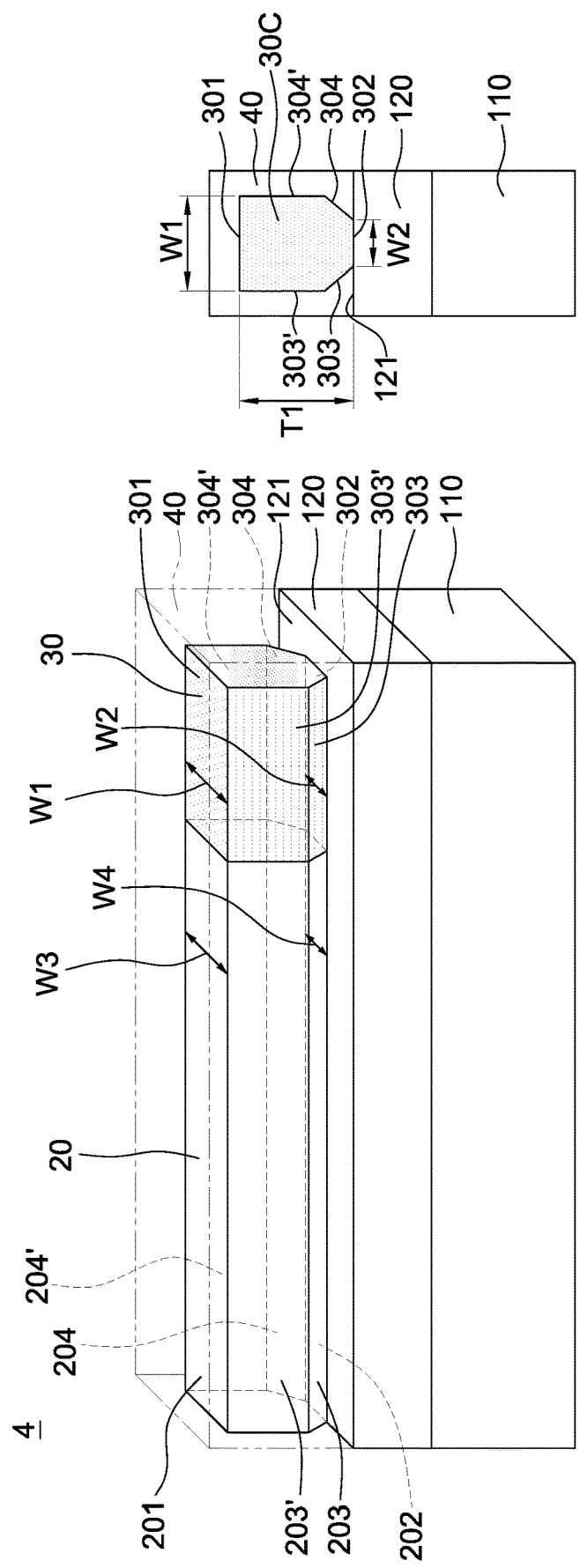
FIG. 4A is a perspective view illustrating a semiconductor structure according to aspects of the present disclosure in one or more embodiments.
FIG. 4B is a cross-sectional view illustrating a semiconductor structure according to aspects of the present disclosure in one or more embodiments.

FIG. 4A is a perspective view illustrating a semiconductor structure 4 according to aspects of the present disclosure in one or more embodiments, and FIG. 4B is a cross-sectional view illustrating a semiconductor structure 4 according to aspects of the present disclosure in one or more embodiments. In some embodiments, FIG. 4B is a cross-sectional view illustrating a portion of the semiconductor structure 4 in FIG. 4A. In some embodiments, the semiconductor structure 4 is similar to the semiconductor structure 1 in FIGS. 1A-1B, with differences therebetween as follows. Descriptions of similar components are omitted.

In some embodiments, the waveguide 20 has side surfaces 203, 203', 204, and 204'. The side surfaces 203' and 204' are substantially perpendicular to the top surface 121 of the insulating layer 120 and the side surfaces 203 and 204 are inclined surfaces and connected to the side surfaces 203' and 204', respectively. In some embodiments, the optical attenuator 30C has side surfaces 303, 303', 304, and 304'. The side surfaces 303' and 304' are substantially perpendicular to the top surface 121 of the insulating layer 120, and the side surfaces 303 and 304 are inclined surfaces and connected to the side surfaces 303' and 304', respectively.

In some embodiments, the optical attenuator 30C may be or include a doped structure. In some embodiments, the optical attenuator 30C has a gradient dopant concentration decreasing in a direction from the top surface 301 to the bottom surface 302 of the optical attenuator 30C. In some embodiments, the width W1 of the top surface 301 of the optical attenuator 30C is substantially the same as the width W3 of the top surface 201 of the waveguide 20. In some embodiments, the width W2 of the bottom surface 302 of the optical attenuator 30C is substantially the same as the width W4 of the bottom surface 204 of the waveguide 20.

FIG. 5A is a perspective view illustrating a semiconductor structure 5 according to aspects of the present disclosure in one or more embodiments, and FIG. 5B is a cross-sectional view illustrating a semiconductor structure 5 according to aspects of the present disclosure in one or more embodiments. In some embodiments, FIG. 5B is a cross-sectional view illustrating a portion of the semiconductor structure 5 in FIG. 5A. In some embodiments, the semiconductor structure 5 is similar to the semiconductor structure 1 in FIGS. 1A-1B, with differences therebetween as follows. Descriptions of similar components are omitted.

In some embodiments, the optical attenuator 30D is disposed on and tapers towards a patterned portion of the insulating layer 120. In some embodiments, the patterned portion of the insulating layer 120 tapers towards the optical attenuator 30D. In some embodiments, the waveguide 20 is disposed on the patterned portion 120P and has a tapered profile that tapers towards the patterned portion 120P. In some embodiments, the optical attenuator 30D may be or include a doped structure. In some embodiments, the doped structure tapers towards and contacts the patterned portion 120P of the insulating layer 120, and the patterned portion 120P tapers towards the doped structure. In some embodiments, the patterned portion 120P has inclined side surfaces 1203 and 1204. In some embodiments, a portion of the dielectric structure 40 extends into a recess defined by the side surface 303 of the optical attenuator 30D and the side surface 1203 of the patterned portion 120P of the insulating layer 120. In some embodiments, a portion of the dielectric structure 40 extends into a recess defined by the side surface 304 of the optical attenuator 30D and the side surface 1204 of the patterned portion 120P of the insulating layer 120.

In some embodiments, the width W1 of the top surface 301 of the optical attenuator 30D is substantially the same as the width W3 of the top surface 201 of the waveguide 20. In some embodiments, the width W2 of the bottom surface 302 of the optical attenuator 30D is substantially the same as the width W4 of the bottom surface 204 of the waveguide 20.

Figure 6B:
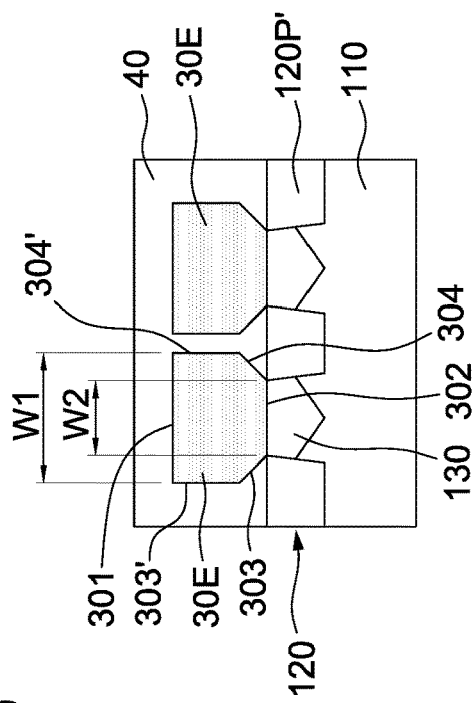
FIG. 6B is a cross-sectional view illustrating a semiconductor structure according to aspects of the present disclosure in one or more embodiments.
Figure 6A:
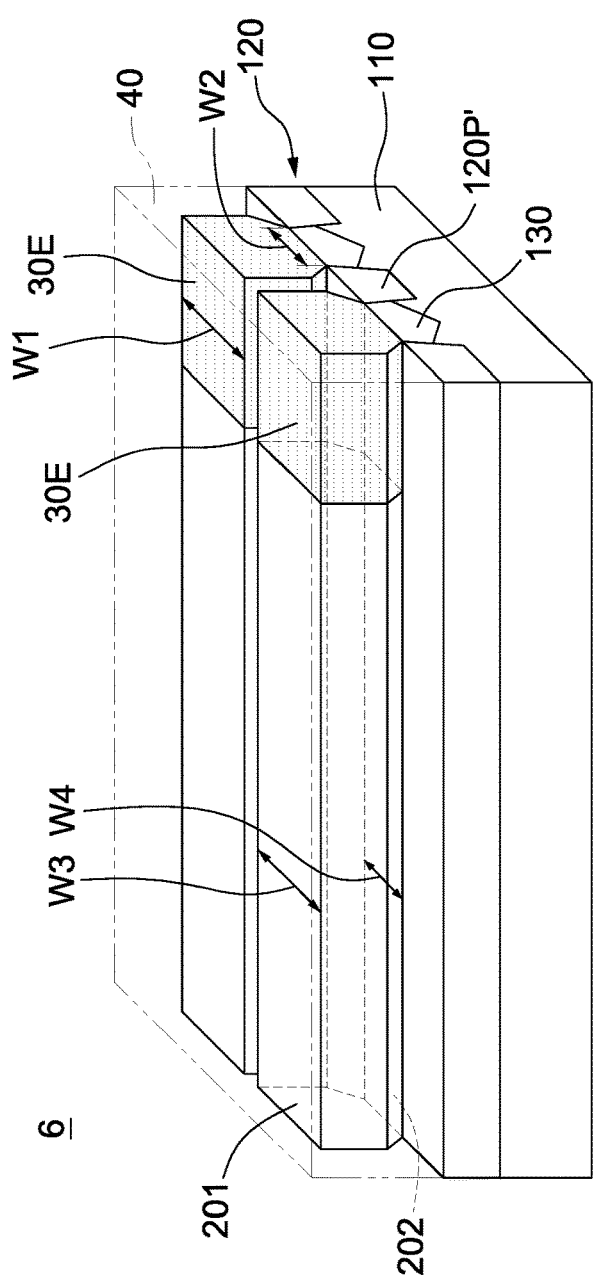
FIG. 6A is a perspective view illustrating a semiconductor structure according to aspects of the present disclosure in one or more embodiments.

FIG. 6A is a perspective view illustrating a semiconductor structure 6 according to aspects of the present disclosure in one or more embodiments, and FIG. 6B is a cross-sectional view illustrating a semiconductor structure 6 according to aspects of the present disclosure in one or more embodiments. In some embodiments, FIG. 6B is a cross-sectional view illustrating a portion of the semiconductor structure 6 in FIG. 6A. In some embodiments, the semiconductor structure 6 is similar to the semiconductor structure 1 in FIGS. 1A-1B, with differences therebetween as follows. Descriptions of similar components are omitted.

In some embodiments, the insulating layer 1220 includes a plurality of isolation structures 120P', and the semiconductor structure 6 further includes one or more epitaxial features 130 defined by the isolation structures 120P'. In some embodiments, the waveguide 20 and the optical attenuator 30E are disposed or formed on the epitaxial feature 130. In some embodiments, the waveguide 20 and the optical attenuator 30E contact the epitaxial feature 130.

In some embodiments, the optical attenuator 30E may be or include a doped structure. In some embodiments, the optical attenuator 30E has a gradient dopant concentration decreasing in a direction from the top surface 301 to the bottom surface 302 of the optical attenuator 30E. In some embodiments, the epitaxial feature 130 may be doped or undoped. In some embodiments, a dopant concentration of the epitaxial feature 130 is lower than the dopant concentration of the optical attenuator 30F. In some embodiments, the width W1 of the top surface 301 of the optical attenuator 30E is substantially the same as the width W3 of the top surface 201 of the waveguide 20. In some embodiments, the width W2 of the bottom surface 302 of the optical attenuator 30F is substantially the same as the width W4 of the bottom surface 204 of the waveguide 20.

FIG. 7A is a cross-sectional view illustrating a semiconductor structure according to aspects of the present disclosure in one or more embodiments. In some embodiments, the semiconductor structure illustrated in FIG. 7A is similar to the semiconductor structure 1 in FIGS. 1A-1B, with differences therebetween as follows. Descriptions of similar components are omitted.

In some embodiments, the optical attenuator 30F has a tapered shape that tapers in a direction from the bottom surface 302 to the top surface 301. In some embodiments, a width W1 of the top surface 301 is less than a width W2 of the bottom surface 302. In some embodiments, the doped structure of the optical attenuator 30F has a gradient dopant concentration decreasing in a direction from the bottom surface 302 to the top surface 301 of the optical attenuator 30F.

In some embodiments, referring to FIG. 1A, the waveguide 20 that connects to the optical attenuator 30F has a tapered shape that tapers in a direction from the bottom surface 202 to the top surface 201. In some embodiments, a width W3 of the top surface 201 is less than a width W4 of the bottom surface 202. In some embodiments, the waveguide 20 and the optical attenuator 30F (or the doped structure) include a same semiconductor material. In some embodiments, the waveguide 20 is formed integrally with the optical attenuator 30F (or the doped structure).

FIG. 7B is a cross-sectional view illustrating a semiconductor structure according to aspects of the present disclosure in one or more embodiments. In some embodiments, the semiconductor structure illustrated in FIG. 7B is similar to the semiconductor structure 2 in FIGS. 2A-2B, with differences therebetween as follows. Descriptions of similar components are omitted.

In some embodiments, the optical attenuator 30G has a tapered shape that tapers in a direction from the bottom surface 302 to a top tip. In some embodiments, the doped structure of the optical attenuator 30G has a gradient dopant concentration decreasing in a direction from the bottom surface 302 to the top tip of the optical attenuator 30G.

In some embodiments, referring to FIG. 2A, the waveguide 20 that connects to the optical attenuator 30G has a tapered shape that tapers in a direction from the bottom surface 202 to a top tip. In some embodiments, the waveguide 20 and the optical attenuator 30G (or the doped structure) include a same semiconductor material. In some embodiments, the waveguide 20 is formed integrally with the optical attenuator 30G (or the doped structure).

FIG. 7C is a cross-sectional view illustrating a semiconductor structure according to aspects of the present disclosure in one or more embodiments. In some embodiments, the semiconductor structure illustrated in FIG. 7C is similar to the semiconductor structure 2 in FIGS. 3A-3B, with differences therebetween as follows. Descriptions of similar components are omitted.

In some embodiments, the optical attenuator 30H has a curved top surface 301. In some embodiments, the optical attenuator 30H has a tapered shape that tapers in a direction from the bottom surface 302 to top surface 301. In some embodiments, the doped structure of the optical attenuator 30H has a gradient dopant concentration decreasing in a direction from the bottom surface 302 to the top surface 301 of the optical attenuator 30H.

In some embodiments, referring to FIG. 3A, the waveguide 20 that connects to the optical attenuator 30H has a curved top surface 201. In some embodiments, the waveguide 20 has a tapered shape that tapers in a direction from the bottom surface 202 to the top surface 201. In some embodiments, the waveguide 20 and the optical attenuator 30H (or the doped structure) include a same semiconductor material. In some embodiments, the waveguide 20 is formed integrally with the optical attenuator 30H (or the doped structure).

FIG. 7D is a cross-sectional view illustrating a semiconductor structure according to aspects of the present disclosure in one or more embodiments. In some embodiments, the semiconductor structure illustrated in FIG. 7D is similar to the semiconductor structure 2 in FIGS. 4A-4B, with differences therebetween as follows. Descriptions of similar components are omitted.

In some embodiments, the optical attenuator 30I has a tapered shape that tapers in a direction from the bottom surface 302 to the top surface 301. In some embodiments, the doped structure of the optical attenuator 30I has a gradient dopant concentration decreasing in a direction from the bottom surface 302 to the top surface 301 of the optical attenuator 30I.

In some embodiments, referring to FIG. 4A, the waveguide 20 that connects to the optical attenuator 30I has a tapered shape that tapers in a direction from the bottom surface 202 to the top surface 201. In some embodiments, the waveguide 20 and the optical attenuator 30I (or the doped structure) include a same semiconductor material. In some embodiments, the waveguide 20 is formed integrally with the optical attenuator 30I (or the doped structure).

FIGS. 8A-1 to 8E-2 are cross-sectional views illustrating a semiconductor structure 5 at various fabrication stages according to aspects of the present disclosure in one or more embodiments.

Figures 2, 8A:
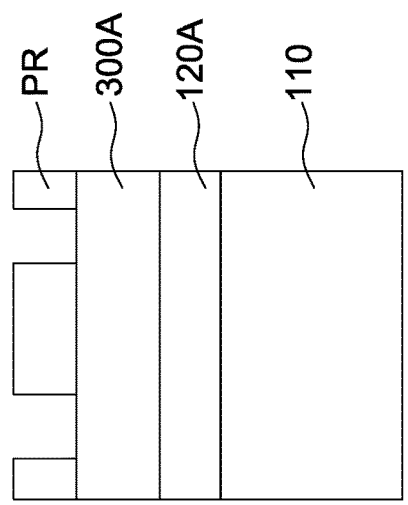
FIGS. 8A-1 to 8E-2 are cross-sectional views illustrating a semiconductor structure at various fabrication stages according to aspects of the present disclosure in one or more embodiments.
Figures 1, 8A:
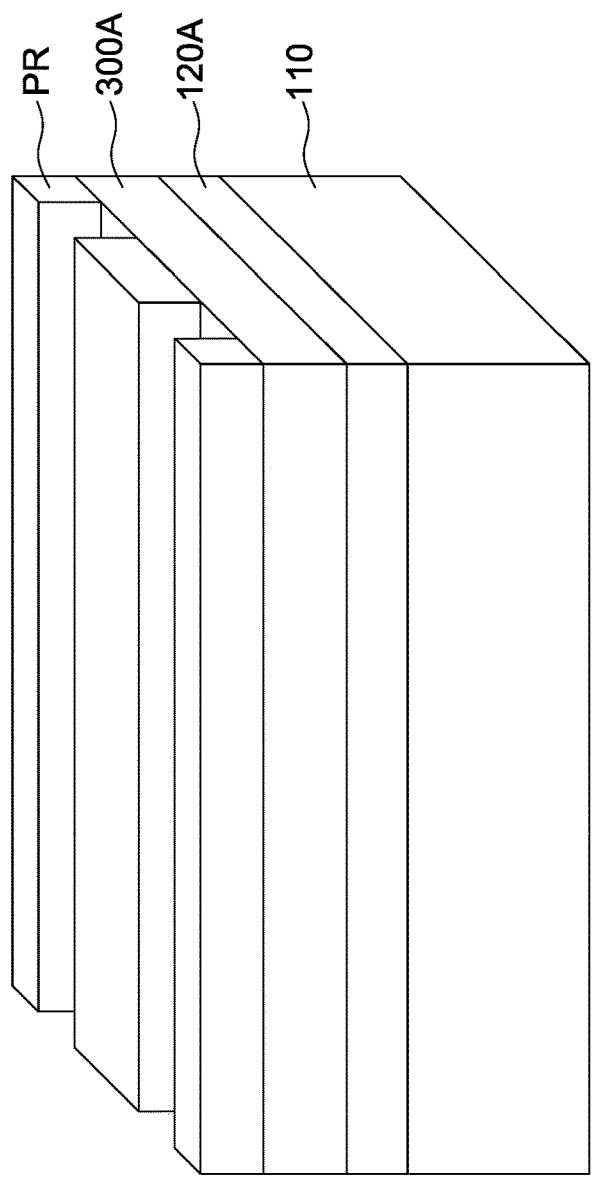

Referring to FIG. 8A-1 and FIG. 8A-2, FIG. 8A-2 is a cross-sectional view of a portion of the structure illustrated in FIG. 8A-1. A semiconductor substrate 110 may be provided, an insulating layer 120A may be formed on the semiconductor substrate 110, a semiconductor layer 300A may be formed on the insulating layer 120A, and a patterned photoresist PR may be formed over the semiconductor layer 300A. In some embodiments, portions of the semiconductor layer 300A are exposed from the patterned photoresist PR.

Figures 2, 8B:
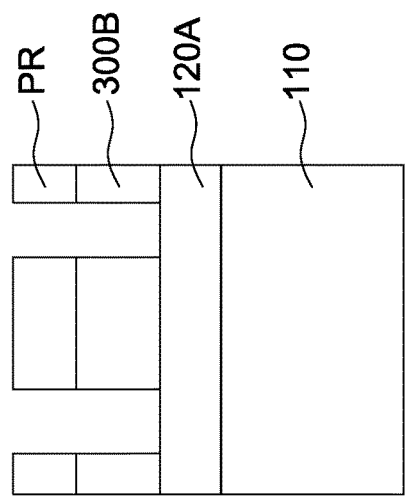
Figures 1, 8B:
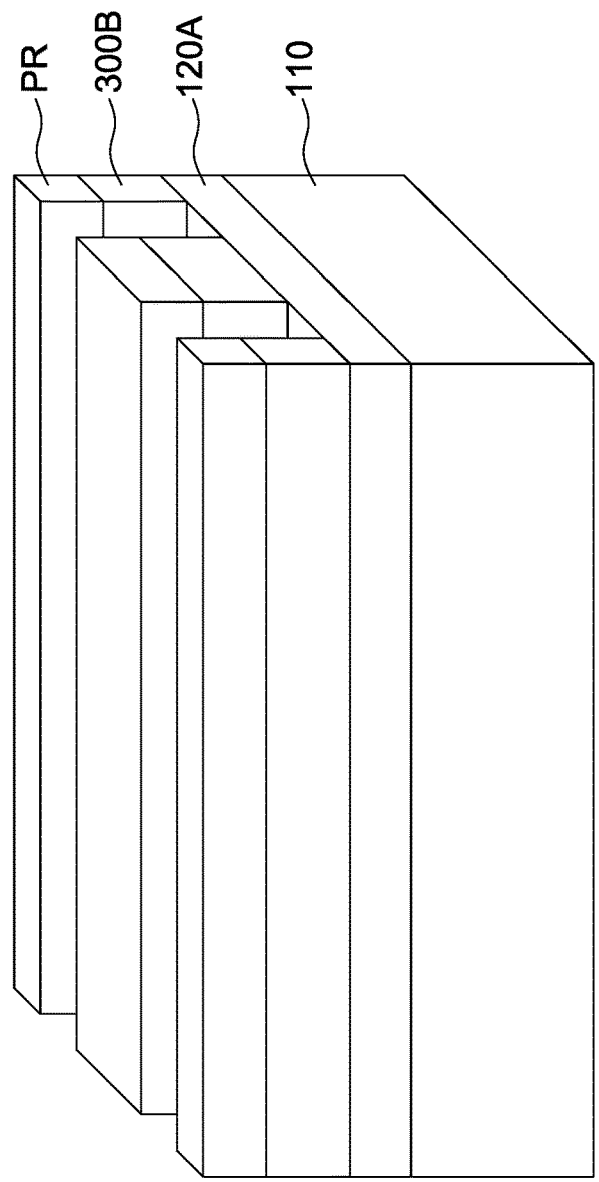

Referring to FIG. 8B-1 and FIG. 8B-2, FIG. 8B-2 is a cross-sectional view of a portion of the structure illustrated in FIG. 8B-1. A patterning process may be performed on the semiconductor layer 300A to form a patterned semiconductor layer 300B. The patterning process may be performed by a dry etch process.

Figures 1, 2, 8C:
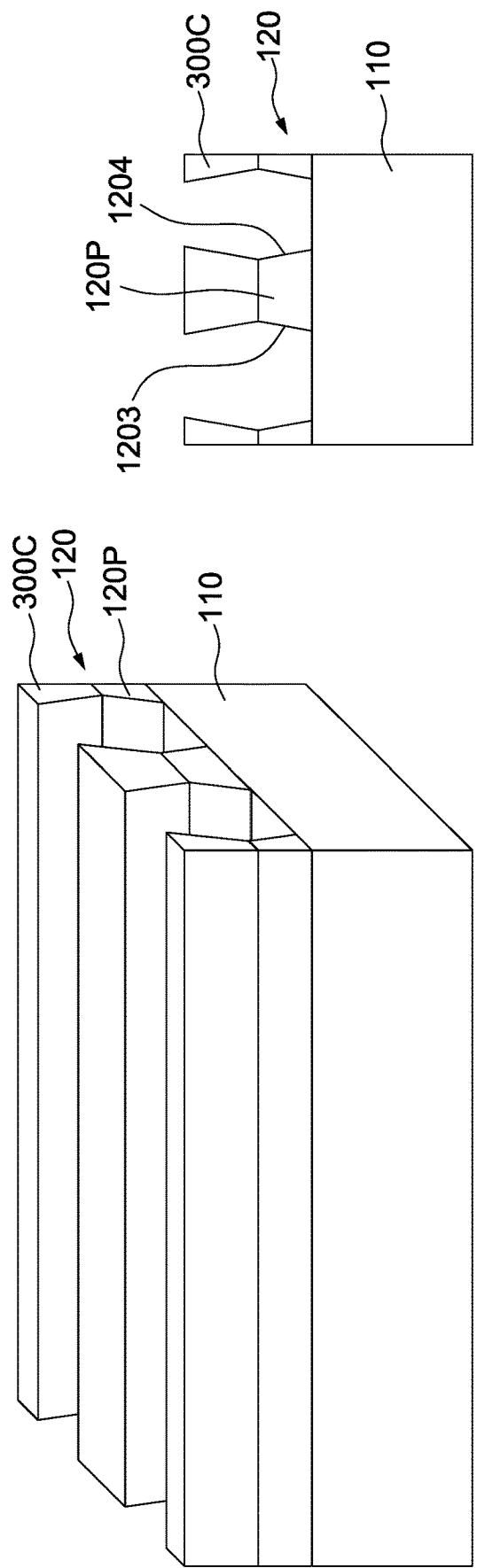

Referring to FIG. 8C-1 and FIG. 8C-2, FIG. 8C-2 is a cross-sectional view of a portion of the structure illustrated in FIG. 8C-1. A patterning process may be performed on the patterned semiconductor layer 300B to form a semiconductor pattern 300C. In some embodiments, a dry etch process may be performed on the insulating layer 120A and side surfaces of the patterned semiconductor layer 300B to form the semiconductor pattern 300C over a top surface of an insulating layer 120. In some embodiments, the as-formed semiconductor pattern 300C has a tapered shape that tapers in a direction normal to the top surface of the insulating layer 120. In some embodiments, the as-formed insulating layer 120 includes a plurality of patterned portions 120P each having a tapered shape that tapers towards the semiconductor pattern 300C. In some embodiments, the dry etch process is performed by applying an etching gas including $CF_4$, $CHF_3$, and $O_2$ under a pressure of about 180 mT. The relatively high chamber pressure make the as-formed semiconductor pattern 300C have side surfaces inclined towards the patterned portion 120P of the insulating layer 120. Besides, the relatively high chamber pressure make the as-formed patterned portion 120P of the insulating layer 120 have side surfaces inclined towards the semiconductor pattern 300C.

Figures 1, 2, 8D:
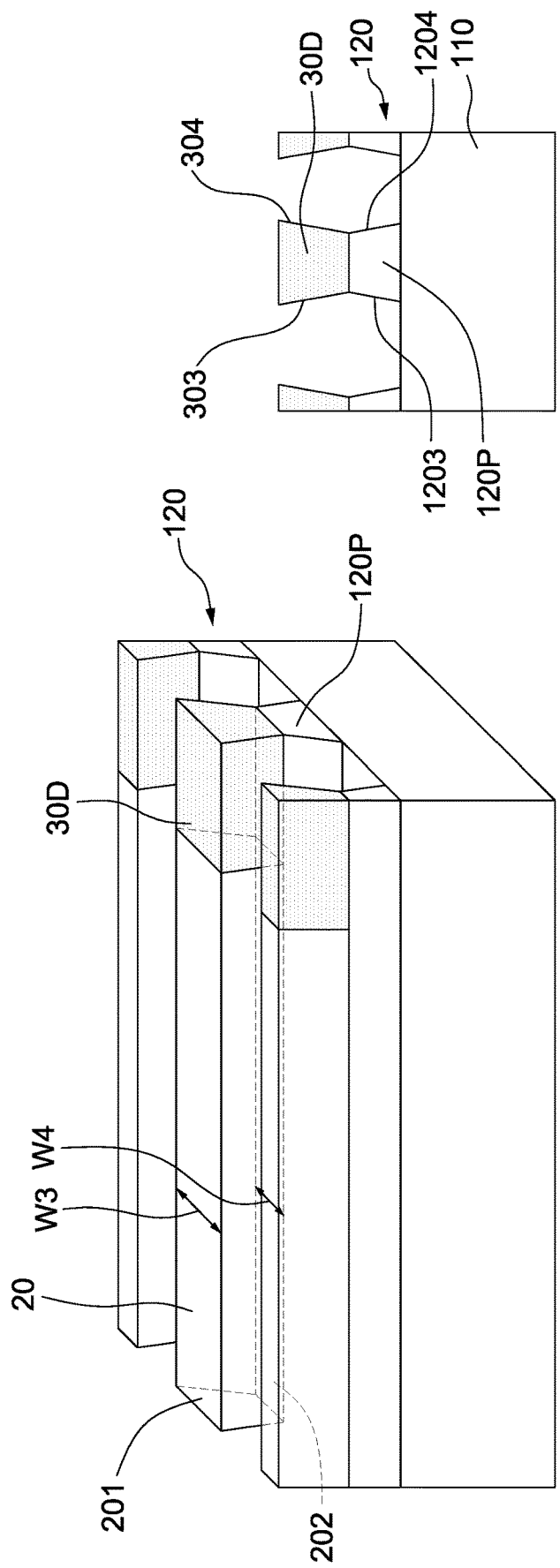

Referring to FIG. 8D-1 and FIG. 8D-2, FIG. 8D-2 is a cross-sectional view of a portion of the structure illustrated in FIG. 8D-1. A doping process may be performed on a predetermined portion of the semiconductor pattern 300C to convert the predetermined portion into an optical attenuator 30D. In some embodiments, the as-formed optical attenuator 30D has a gradient dopant concentration decreasing in the direction from a top surface to a bottom surface of the optical attenuator 30D after the doping process. In some embodiments, the semiconductor pattern 300C further includes a waveguide portion connected to the predetermined portion that is free from the doping process. The waveguide portion forms a waveguide 20.

Figures 1, 2, 8E:
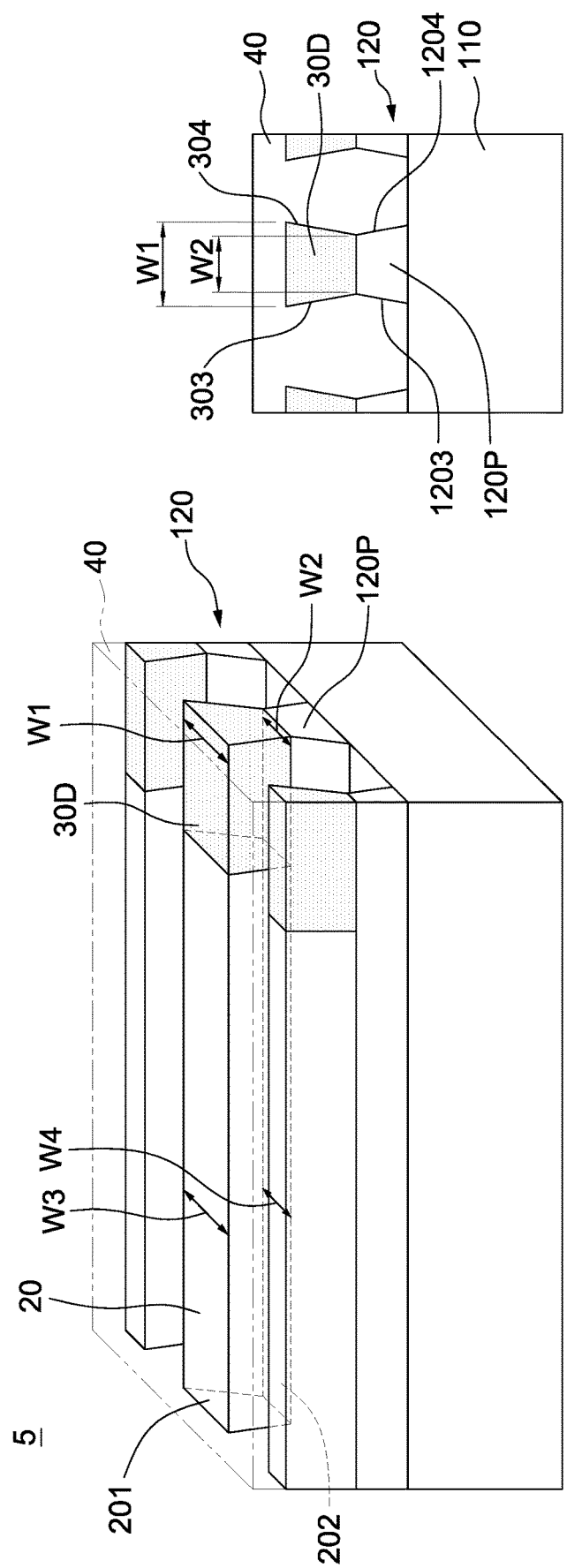

Referring to FIG. 8E-1 and FIG. 8E-2, FIG. 8E-2 is a cross-sectional view of a portion of the structure illustrated in FIG. 8E-1. A dielectric structure 40 may be formed to cover the optical attenuator 30D and the waveguide 20 (or the waveguide portion) after the doping process. As such, the semiconductor structure 5 is formed.

FIGS. 9A-1 to 9G-2 are cross-sectional views illustrating a semiconductor structure 6 at various fabrication stages according to aspects of the present disclosure in one or more embodiments.

Referring to FIG. 9A-1 and FIG. 9A-2, FIG. 9A-2 is a cross-sectional view of a portion of the structure illustrated in FIG. 9A-1. A semiconductor substrate 110A including a plurality of protrusions (or fins) are provided. In some embodiments, a semiconductor substrate may be provided, a patterned mask layer may be disposed over the semiconductor substrate exposing portions of the semiconductor substrate, and an etching process may be performed on the semiconductor substrate to remove portions of the semiconductor substrate exposed by the patterned mask layer. Then, the remained portion of the semiconductor substrate form the semiconductor substrate 110A including the protrusions (or fins).

Figures 1, 9B:
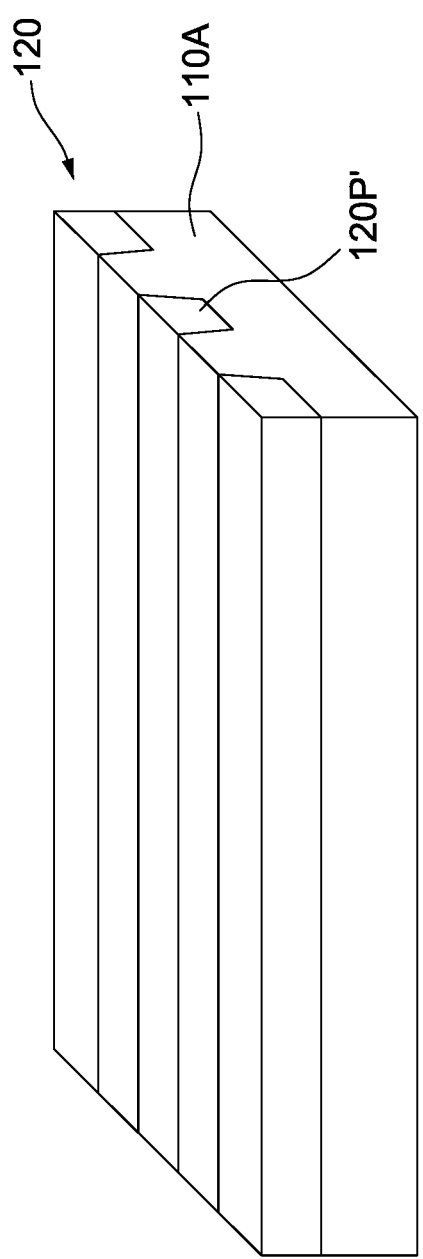
Figures 2, 9B:
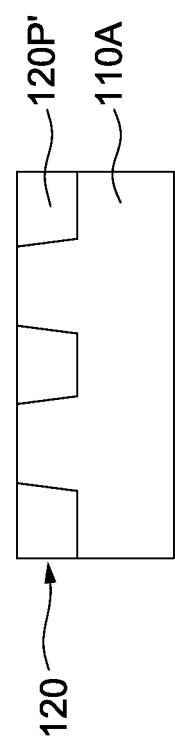

Referring to FIG. 9B-1 and FIG. 9B-2, FIG. 9B-2 is a cross-sectional view of a portion of the structure illustrated in FIG. 9B-1. An insulating layer 120 including a plurality of isolation structures 120P' may be formed on the semiconductor substrate 110A An insulating material may be formed over and covering the semiconductor substrate 110A and the patterned mask layer, for example, by deposition. Next, a chemical mechanical polish (CMP) process may be performed to remove the patterned mask layer and a portion of the insulating material to form the isolation structures 120P' of the insulating layer 120.

Referring to FIG. 9C-1 and FIG. 9C-2, FIG. 9C-2 is a cross-sectional view of a portion of the structure illustrated in FIG. 9C-1. A wet etch process may be performed on portions of the semiconductor substrate 110A exposed by the isolation structures 120P' to form a semiconductor substrate 110 having recesses defined by surfaces having facets. The facets may be angled to a substrate surface. In some embodiments, the wet etch process includes applying a wet etch solution including potassium hydroxide (KOH) or tetramethyl ammonium hydroxide (TMAH) on the exposed portions of the semiconductor substrate 110A.

Referring to FIG. 9D-1 and FIG. 9D-2, FIG. 9D-2 is a cross-sectional view of a portion of the structure illustrated in FIG. 9D-1. An epitaxial feature 130 may be formed on the facets of the recesses of the semiconductor substrate 110. In some embodiments, the epitaxial feature 130 may be formed by epitaxial growth. In some embodiments, the epitaxial feature 130 is defined by the isolation structures 120P'.

Referring to FIG. 9E-1 and FIG. 9E-2, FIG. 9E-2 is a cross-sectional view of a portion of the structure illustrated in FIG. 9E-1. A semiconductor pattern may be formed on the epitaxial features 130. In some embodiments, the semiconductor pattern may be formed by deposition, e.g., epitaxial growth.

Referring to FIG. 9F-1 and FIG. 9F-2, FIG. 9F-2 is a cross-sectional view of a portion of the structure illustrated in FIG. 9F-1. A doping process may be performed on a predetermined portion of the semiconductor pattern to convert the predetermined portion into an optical attenuator 30E. In some embodiments, the as-formed optical attenuator 30E has a gradient dopant concentration decreasing in the direction from a top surface to a bottom surface of the optical attenuator 30E after the doping process. In some embodiments, the semiconductor pattern further includes a waveguide portion connected to the predetermined portion that is free from the doping process. The waveguide portion forms a waveguide 20.

Figures 1, 9G:
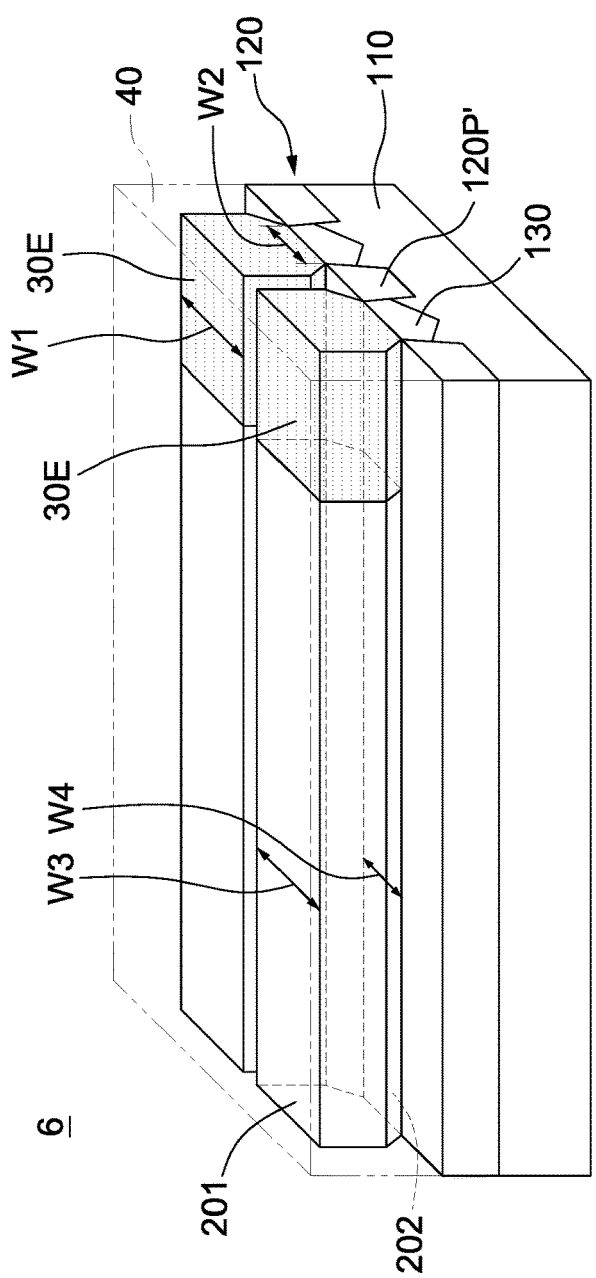
Figures 2, 9G:
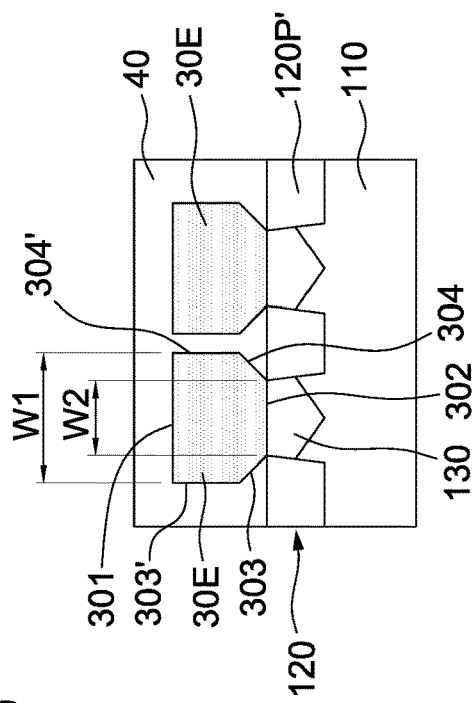

Referring to FIG. 9G-1 and FIG. 9G-2, FIG. 9G-2 is a cross-sectional view of a portion of the structure illustrated in FIG. 9G-1. A dielectric structure 40 may be formed to cover the optical attenuator 30E and the waveguide 20 (or the waveguide portion) after the doping process. As such, the semiconductor structure 6 is formed.

Some embodiments of the present disclosure provide a semiconductor structure. The semiconductor structure includes a waveguide and an optical attenuator. The waveguide is disposed over an insulating layer and configured to guide light. The optical attenuator is connected to the waveguide. The optical attenuator has a first surface and a second surface opposite the first surface, and a cross-sectional width of the optical attenuator decreases from the first surface to the second surface.

Some embodiments of the present disclosure provide a semiconductor structure. The semiconductor structure includes a waveguide and a doped structure. The waveguide is disposed over a top surface of an oxide layer and configured to guide light. The doped structure is connected to the waveguide. The doped structure has a tapered shape that tapers in a direction normal to the top surface of the oxide layer.

Some embodiments of the present disclosure provide a method for forming a semiconductor structure. The method includes following operations: forming a semiconductor pattern over a top surface of an insulating layer, the semiconductor pattern having a tapered shape that tapers in a direction normal to the top surface of the insulating layer, wherein the semiconductor pattern comprises a predetermined portion and a waveguide portion connected to the predetermined portion; and performing a doping process on the predetermined portion of the semiconductor pattern to convert the predetermined portion into an optical attenuator.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:
   a waveguide disposed over an insulating layer and configured to guide light; and
   an optical attenuator connected to the waveguide, wherein the optical attenuator comprises a tapered doped structure having a gradient dopant concentration decreasing in a direction which the tapered doped structure tapers towards, and the direction is normal to a top surface of the insulating layer.

2. The semiconductor structure of claim 1, wherein the optical attenuator has a first surface, a second surface opposite to the first surface, and a third surface extending between the first surface and the second surface, the optical attenuator contacts the insulating layer by the second surface, and the optical attenuator contacts the waveguide by the third surface.

3. The semiconductor structure of claim 2, wherein a cross-sectional width of the optical attenuator decreases from the first surface to the second surface.

4. The semiconductor structure of claim 3, wherein the gradient dopant concentration decreases towards the insulating layer.

5. The semiconductor structure of claim 1, wherein the optical attenuator is disposed on and tapers towards a patterned portion of the insulating layer, and the patterned portion tapers towards the optical attenuator.

6. The semiconductor structure of claim 5, wherein the waveguide is disposed on the patterned portion and has a tapered profile that tapers towards the patterned portion.

7. The semiconductor structure of claim 1, wherein the insulating layer comprises a plurality of isolation structures, the semiconductor structure further comprises an epitaxial feature defined by the isolation structures, and the waveguide and the optical attenuator contact the epitaxial feature.

8. A semiconductor structure, comprising:
a waveguide disposed over a top surface of an oxide layer and configured to guide light; and
a doped structure connected to the waveguide, wherein the doped structure has a tapered shape that tapers in a direction normal to the top surface of the oxide layer, and the doped structure has a gradient dopant concentration decreasing in the direction.

9. The semiconductor structure of claim 8, wherein the doped structure tapers towards and contacts the oxide layer.

10. The semiconductor structure of claim 9, wherein the waveguide and the doped structure comprise a same semiconductor material.

11. The semiconductor structure of claim 8, wherein the waveguide has a tapered shape that tapers in the direction.

12. The semiconductor structure of claim 11, wherein the waveguide is formed integrally with the doped structure.

13. The semiconductor structure of claim 8, wherein the doped structure has a lateral surface that contacts the waveguide and is substantially perpendicular to the top surface of the oxide layer.

14. The semiconductor structure of claim 8, wherein the doped structure tapers towards and contacts a patterned portion of the oxide layer, and the patterned portion tapers towards the doped structure.

15. The semiconductor structure of claim 8, further comprising an epitaxial feature defined by patterned portions of the oxide layer, and the waveguide and the doped structure contact the epitaxial feature.

16. A method for forming a semiconductor structure, comprising:
forming a semiconductor pattern over a top surface of an insulating layer, the semiconductor pattern having a tapered shape that tapers in a direction normal to the top surface of the insulating layer, wherein the semiconductor pattern comprises a predetermined portion and a waveguide portion connected to the predetermined portion; and
performing a doping process on the predetermined portion of the semiconductor pattern to convert the predetermined portion into an optical attenuator,
wherein the optical attenuator has a gradient dopant concentration decreasing in the direction after the doping process.

17. The method of claim 16, wherein the waveguide portion is free from the doping process.

18. The method of claim 16, further comprising forming a dielectric structure covering the optical attenuator and the waveguide portion after the doping process.

19. The method of claim 16, further comprising:
forming a semiconductor layer on the insulating layer; and
performing a dry etch process on the semiconductor layer and the insulating layer to form the semiconductor pattern on a patterned portion of the insulating layer.

20. The method of claim 16, wherein the insulating layer comprises a plurality of isolation structures, the method further comprising:
forming an epitaxial feature defined by the isolation structures, wherein the semiconductor pattern is formed on the epitaxial feature.

* * * * *